Oct. 28, 1969  V. TAKATA  3,474,945
MODULATING DRIVE FOR STRIP-LIKE MATERIAL

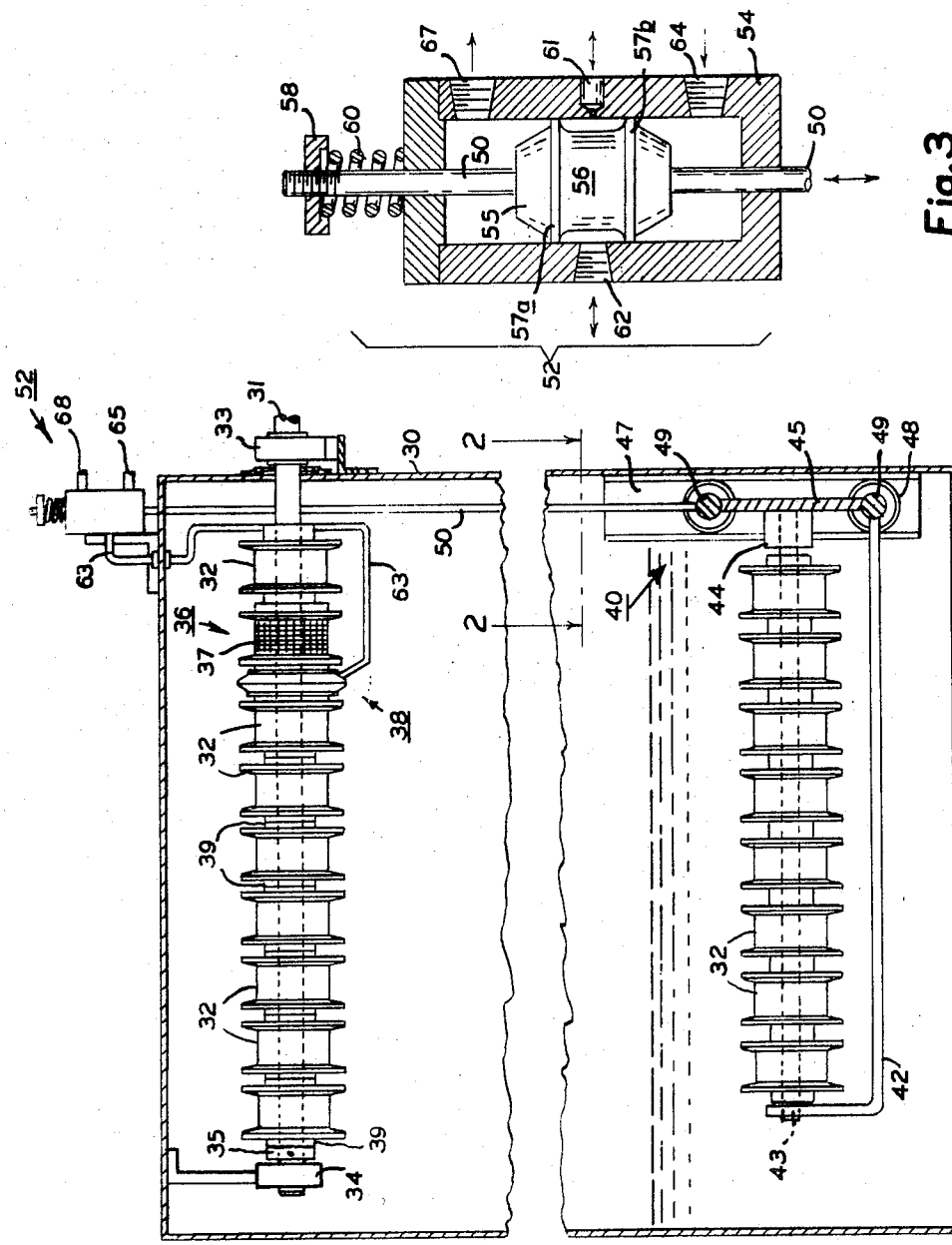

Filed Sept. 12, 1966  7 Sheets-Sheet 2

INVENTOR.
VICTOR TAKATA
BY Richard L. Cannaday
ATTORNEY

Oct. 28, 1969　　　　　V. TAKATA　　　　　3,474,945
MODULATING DRIVE FOR STRIP-LIKE MATERIAL
Filed Sept. 12, 1966　　　　　　　　　　7 Sheets-Sheet 3
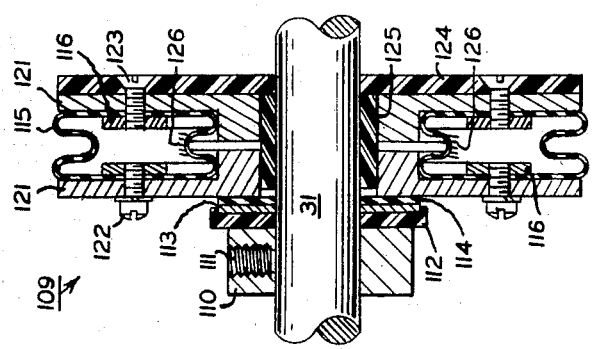
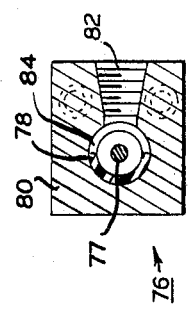
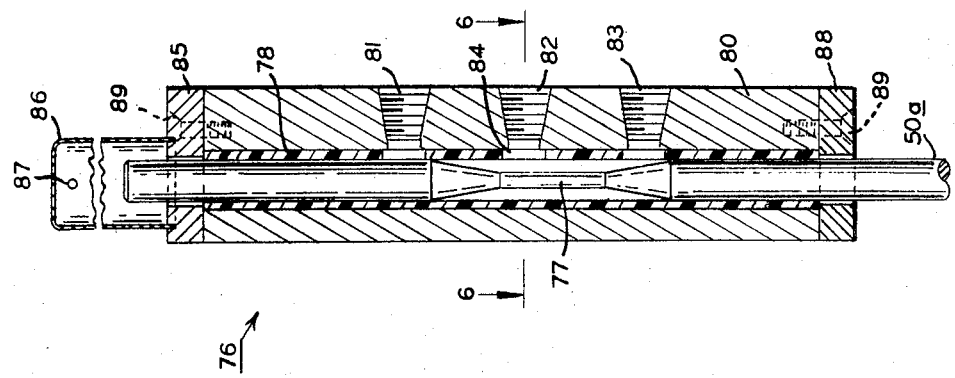
INVENTOR.
VICTOR TAKATA
BY
*Richard L. Cannaday*
ATTORNEY

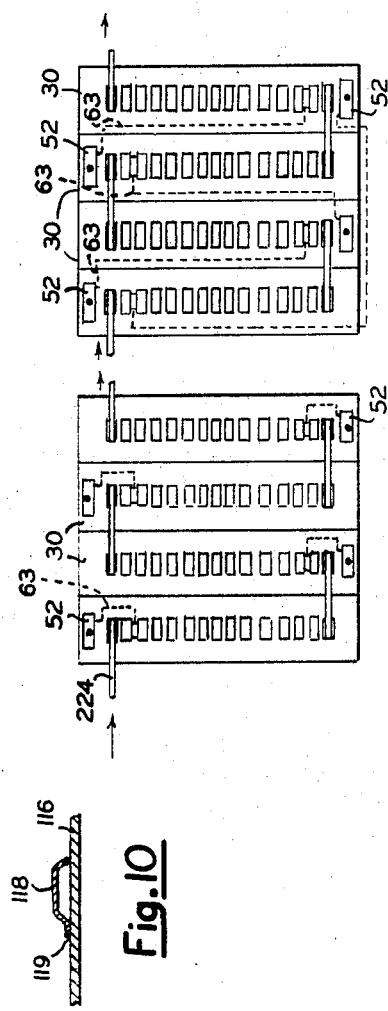
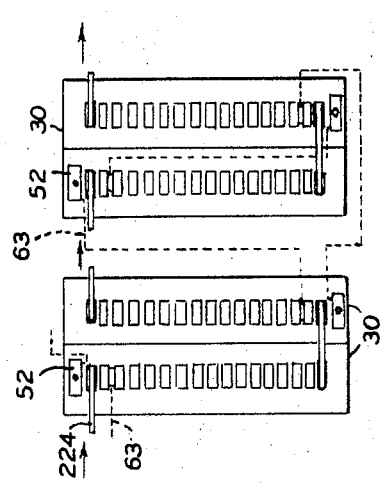
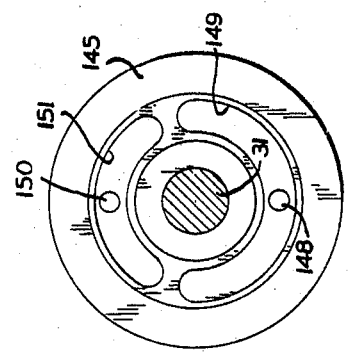
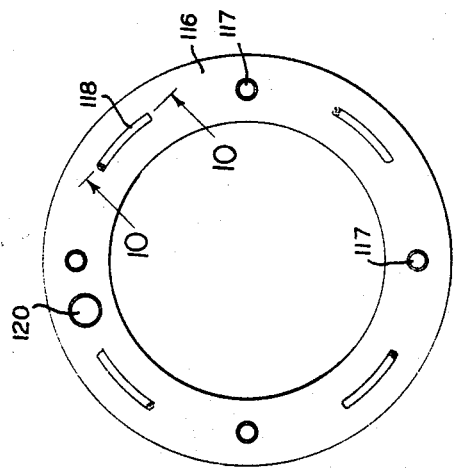
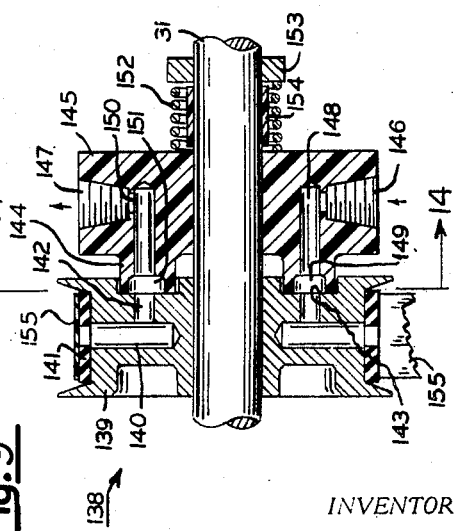
INVENTOR.
VICTOR TAKATA
BY Richard L. Cannaday
ATTORNEY Oct. 28, 1969  V. TAKATA  3,474,945
MODULATING DRIVE FOR STRIP-LIKE MATERIAL
Filed Sept. 12, 1966  7 Sheets-Sheet 5
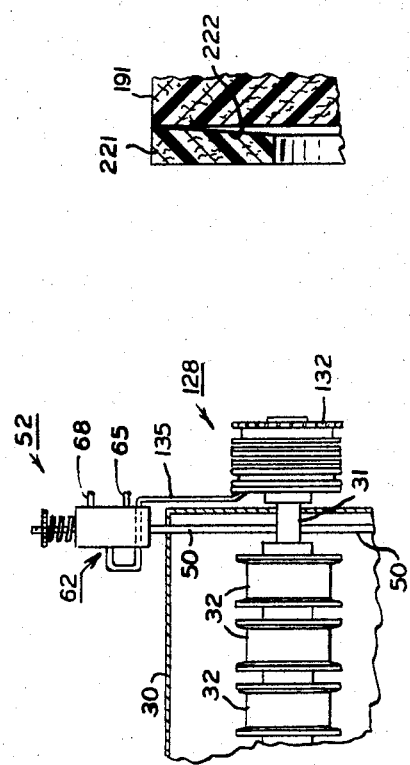
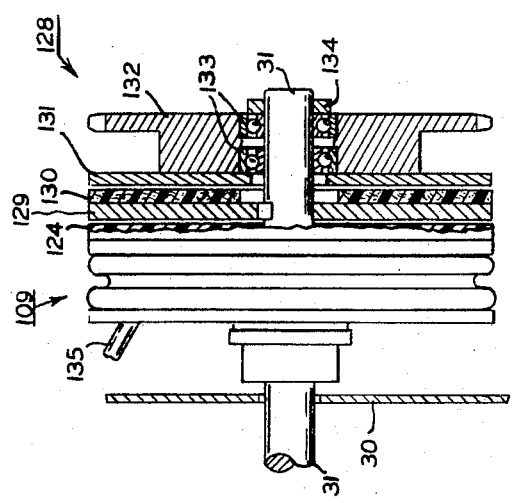
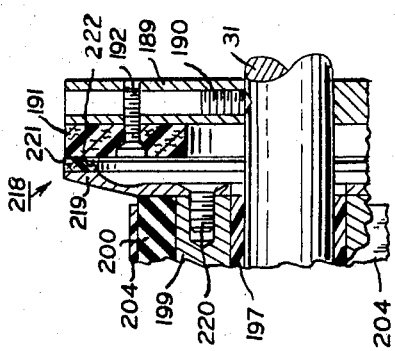
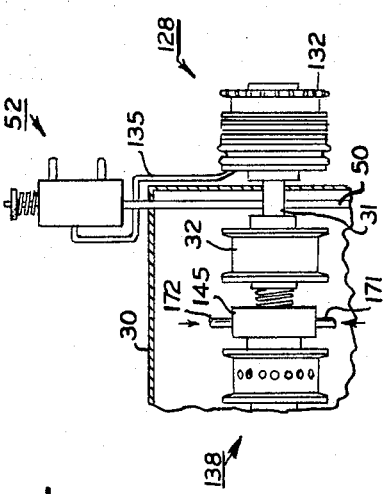
INVENTOR.
VICTOR TAKATA
BY Richard L. Canaday
ATTORNEY

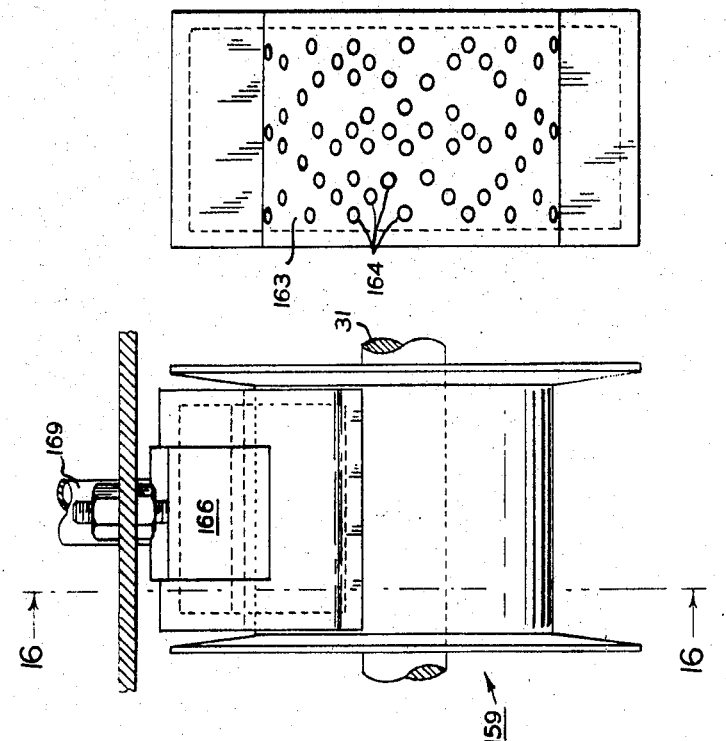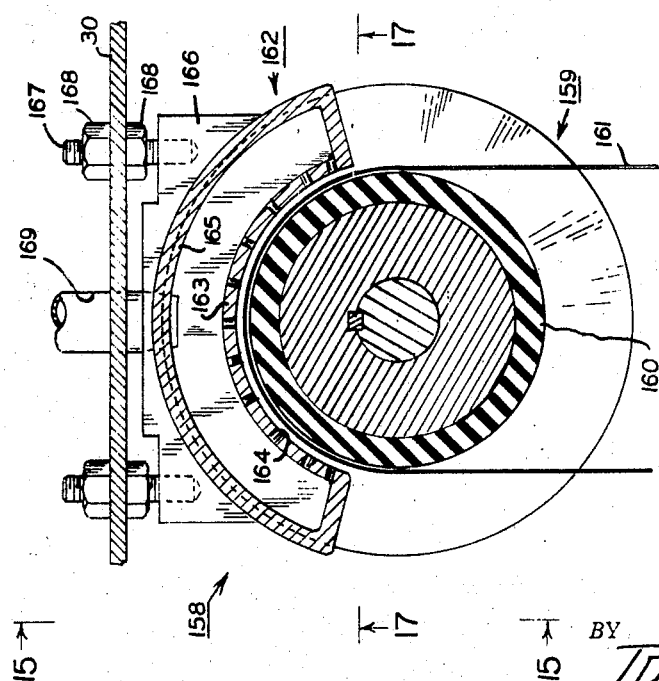

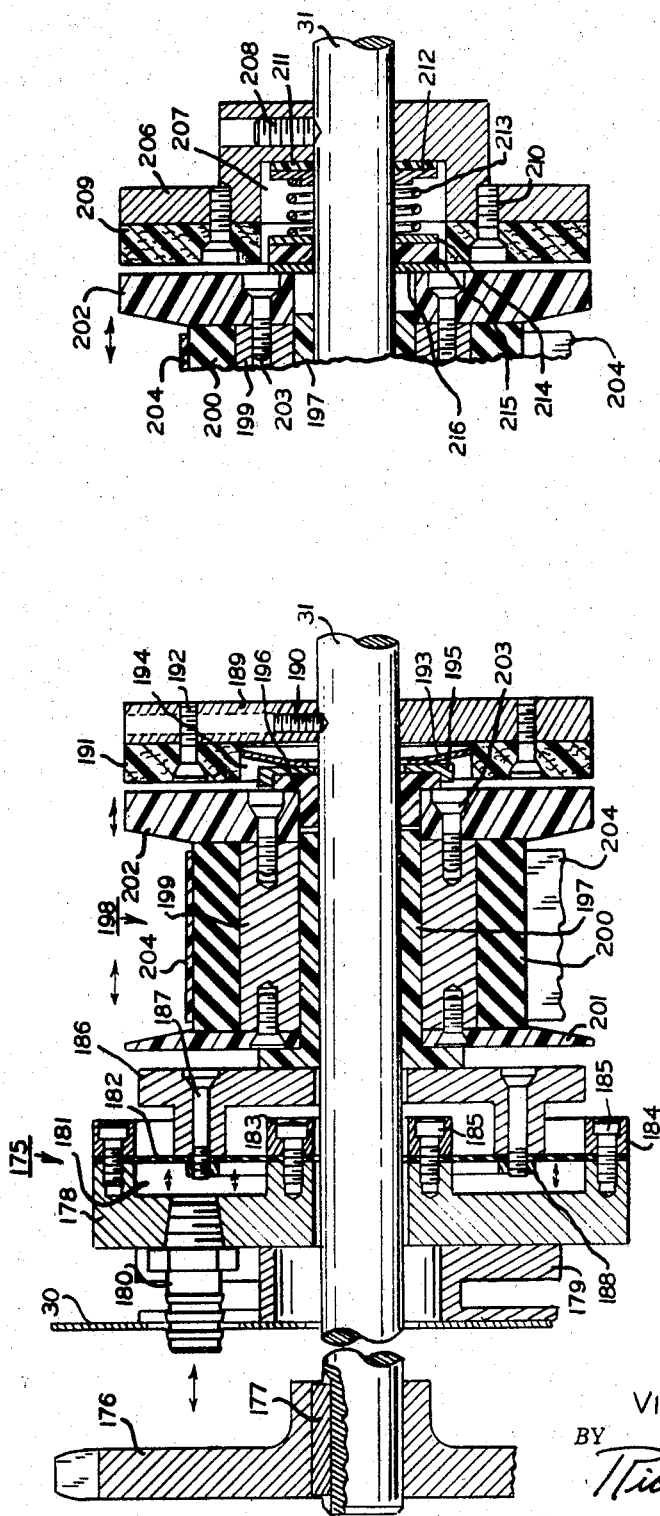

United States Patent Office 3,474,945
Patented Oct. 28, 1969

3,474,945
MODULATING DRIVE FOR STRIP-LIKE MATERIAL
Victor Takata, Cambridge, Mass., assignor to Artisan Industries Inc., Waltham, Mass., a corporation of Massachusetts
Filed Sept. 12, 1966, Ser. No. 578,768
Int. Cl. B65h 17/00, 25/04
U.S. Cl. 226—1   20 Claims

ABSTRACT OF THE DISCLOSURE

This invention relates to a modulating drive for strip-like material whereby the tractive effect of a drive mechanism on such material passing over or across it is regulated, and particularly to a modulating drive for continuously feeding at an overall determined speed an extended length of strip-like material such as photographic film.

---

More particularly this invention relates to an apparatus for and method of modulating the drive of a film processing system, the drive being rendered responsive to the tension developed in a length of exposed film fed in a helical manner over spools on shafts disposed one above the other.

Still more particularly this invention relates to an apparatus for and method of modulating the drive of a film processing system and the like by means of a flow control valve adapted to impose or relieve pressure on film passing around a drive spool and thereby increase or decrease the film gripping effect of at least one spool on at least one shaft of two shafts disposed one above the other and carrying spools arranged for the helically wound transport of a length of exposed film, the lower shaft being movable vertically in response to the tension in the film being transported and in its movements actuating the flow control valve.

Even still more particularly this invention relates to an apparatus for and a method of modulating the drive of a film processing system and the like where the system includes a film transporting bank having an upper and a lower shaft each carrying a series of spools arranged to feed a continuous strip of exposed film in a helical manner, the lower shaft being disposed to act as an elevator to move in response to an increase or decrease in the tension of the film and in its movement actuate a flow control valve to impose or relieve pressure on a clutch by which the speeds of the spools on at least one shaft are increased or decreased either through change in shaft speed or in relation to an established shaft speed.

BACKGROUND OF THE INVENTION

In the processing of a strip of exposed motion picture film it is most important that a very accurate timewise exposure or contact of the film material with the various processing materials and solutions be maintained. Currently used high speed and color films require in their processing or developing steps certain treatments which are particularly noted as being of very short duration, for example, only a few seconds. Certain other steps of greater duration likewise require that the treatment time interval be closely regulated. As the reels of exposed film are usually several hundred feet in length, the most practical manner of processing is to feed the film in a continuous manner through a multiplicity of tanks in which each of the processing reactions may be precisely controlled. During processing it is highly desirable that the emulsion side of the film be free of contact with anything but the materials or chemicals used in the steps of developing. It is also to be borne in mind that the damp or wet film may be subject to unwanted stretching if undue or excessive tension is imposed upon it as it is transported the various processing steps.

Automatic processing of film has been practiced for a number of years. Known apparatus for this practice includes banks of spools carried on upper and lower shafts. The spools are arranged to transport the film in a helical manner. Included in one of the known processing systems is apparatus in which the upper and lower spool-carrying shafts are in fixed relationship to each other with at least some of the spools on the lower shaft being driven so as to provide surface speeds in excess of the desired film speed. This method anticipates that film traveling a little too fast will bulge slightly from the determined path causing a slight reduction of the overall contact force of the film upon the driving spool or spools and slowing the film. If the film travels a little too slowly it does not bulge but engages the spool with a relatively greater overall contact force so as to increase its, the film's, speed. In other known systems vertically movable lower shafts are used and the speed of the film is regulated by employing an intermittent drive or by passing the film over drive spools of successively varying sizes. Still another known system utilizes a fixed sprocket on each shaft of the bank. As long as the size, type and sprocket engaging apertures of the film are the same this method of automatic processing is satisfactory, but necessarily has only very limited flexibility.

The present invention relates to an apparatus and method for film processing and the like in which film is fed to at least one bank of spools having an upper shaft and a lower shaft. The lower shaft is carried by an elevator having a means for actuating a flow control valve in response to the reciprocation of the elevator. The flow control valve modulates a flow of pressurized air, gas, or liquid, or the application of a vacuum to the interior of a clutch, spool or chamber to increase or decrease the speed of film. The flow control valve may be connected to apparatus in the same or different banks of spools. According to the inventive concepts hereinafter more fully described, variations in the tension in the strip of film being transported through the bank are used to raise and lower the elevator. Thus since the film being transported is accelerated or decelerated in response to the movement of the elevator as stated above, it is also and ultimately accelerated or decelerated according to its own tension varying either side of a normal value.

It is therefore an object of this invention to provide an apparatus for and a method of modulating the speed of traveling material of strip-like form, the modulation being responsive to the tension in the material.

It is a further object of this invention to provide an apparatus for and a method of modulating the speed and tension of a traveling film strip disposed in a helix around spools carried on upper and lower shafts, the lower shaft being mounted on an elevator movable responsively to the tension of the traveling film, the elevator movement actuating a flow control valve adapted to accelerate or decelerate the film drive means or, most desirably, hold it in an essentially steady running condition.

It is a further object of this invention to provide apparatus for and a method of modulating the speed of a traveling film strip which is disposed in a helix around spools carried on upper and lower shafts, the lower shaft being mounted on an elevator movable responsively to the tension of the film strip and the elevator movement actuating a flow control valve adapted to transmit a fluid pressure signal or effect including a vacuum effect or signal, to actuate a clutch to accelerate or decelerate the spools carrying the traveling film.

It is a further object of this invention to provide an apparatus for and a method of modulating the speed of a traveling film strip which is disposed in a helix around spools carried on upper and lower shafts, the lower shaft being mounted on an elevator movable responsively to the tension of the film strip and the elevator movement actuating a flow control valve adapted to transmit pressurized air, liquid and the like and/or vacuum for application against the film to increase or decrease the grip of at least one spool thereon whereby the driving effect of this spool is correspondingly increased or decreased and the film accelerated or decelerated.

These and other objects and advantages of the present invention as well as its nature and substance will be more clearly perceived and fully understood by referring to the following description and claims taken in connection with the accompanying drawings in which:

FIG. 1 represents a sectional side view of a typical film processing tank equipped with a modulating drive assembly representative of the present invention;

FIG. 3 represents a sectional side view of a modulating drive flow control valve;

FIG. 5 represents a sectional side view of still another modulating drive flow control valve;

FIG. 6 represents a transverse sectional view of the valve of FIG. 5 taken along line 6—6 therein looking in the direction of the arrows;

FIG. 8 represents a sectional side view of another construction of a bellows-type slip clutch;

FIG. 9 represents a plan view of a retaining ring used in the bellows-type clutch of FIG. 8;

FIG. 10 represents a fragmentary sectional view showing the spring hook of the retaining ring of FIG. 9 taken along line 10—10 therein looking in the direction of the arrows;

FIG. 11 represents a fragmentary sectional side view of a modulating drive including a sprocket drive and bellows-type slip clutch assembly using the bellows of FIG. 8, the drive being adapted to rotate the spool-carrying shaft at a tension-responsive variable speed;

FIG. 12 represents an enlarged view, partly in section, of a detail of the drive of FIG. 11;

FIG. 13 represents a sectional view of a film transporting spool assembly with a first kind of fluid-actuated film gripping and releasing means;

FIG. 14 represents a face view of the pulley engaging and fluid distributing member of the assembly of FIG. 13 taken along line 14—14 therein looking in the direction of the arrows;

FIG. 15 represents a side view of a film transporting spool assembly with a second kind of fluid-actuated film gripping and releasing means taken along line 15—15 in FIG. 16 looking in the direction of the arrows;

FIG. 16 represents a sectional view of the film transporting spool assembly of FIG. 15 taken along line 16—16 therein looking in the direction of the arrows;

FIG. 17 represents a view looking into the perforated face of the fluid distribution chamber adjacent the film transporting surface of the spool of the assembly of FIG. 16 taken along line 17—17 therein looking in the direction of the arrows;

FIG. 18 represents a fragmentary sectional view showing a modulating drive with a bellows-type slip clutch assembly in the manner of FIG. 11 and the fluid-actuated film gripping and releasing means of FIG. 13;

FIG. 19 represents a sectional view of a diaphragm assembly including a slip clutch for providing a modulated drive to a film-carrying spool;

FIG. 20 represents a fragmentary sectional view of a slip clutch mechanism of the type shown in FIG. 19 in which another form of a spring means is used;

FIG. 21 represents a fragmentary sectional view of a slip clutch mechanism of the type shown in FIG. 19 in which still another form of spring means is used;

FIG. 22 represents in enlarged scale a fragmentary sectional view of the spool flange clutch ring of FIG. 21;

FIG. 23 represents a somewhat diagrammatic plan view showing a flow control arrangement of the modulating drives in a series of tanks;

FIG. 24 represents a somewhat diagrammatic plan view showing another flow control arrangement of the modulating drives in another series of tanks, and FIG. 25 represents a somewhat diagrammatic plan view showing still another flow control arrangement of the modulating drives in still another series of tanks.

Figure 2:
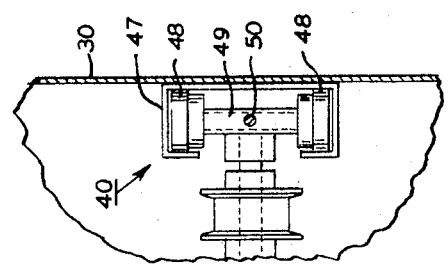
FIG. 2 represents a fragmentary sectional plan view showing a portion of an elevator mechanism taken along line 2—2 in FIG. 1 looking in the direction of the arrows.

Referring now to the drawings in detail in which like numbers designate like members throughout the several figures, it is to be noted that in FIGS. 1 and 2 there is shown a processing tank 30 which although shown as being closed may be either open or closed at the top and which in the illustrated embodiment carries an upper shaft 31 on which there are mounted a series of film spools adapted to transport or convey film for processing into and out of the tank in a helical array and in a continuous manner. A series of film transporting spools 32 of conventional construction are freely rotatably and axially slidably mounted upon shaft 31, except for spool 32 farthest to the right which is freely rotatable only. This shaft itself is rotatably supported and retained by a bearing 33 mounted on a side wall or panel of processing tank 30, and is further supported within the tank by a depending bracket and bearing 34 near which there is a banking collar 35 pinned to the shaft. While the first or film in-leading spool 32 is of conventional construction, the next adjacent spool to the left generally designated 36 which is fixed to the shaft may have a special surface in its central portion 37 upon which film is carried, at least an outermost layer of this portion being of resilient material into which a series of both circumferential and longitudinal cuts are effected to provide a tread in the exterior surface of this central or film transporting portion 37. These cuts are of sufficient spacing and depth that as spool 36 is rotated the tread surface presented to the film causes the film to be more positively gripped and advanced.

Between spool 36 and the next leftward regular spool 32 there is a bellows slip clutch generally designated 38 which is more fully described hereinafter. Between successive regular spools 32 there are pairs of collars 39. Individually these collars may be formed as bosses on the spools, but preferably are independent elements and must in any case be free to move axially along shaft 31. The collars are so sized as to permit each spool 32 to rotate on shaft 31 essentially independently of the adjacent spools in the absence of an axial compacting force on the spool array. A longitudinal or axial force may be applied to cause an increase in the frictional engagement of adjacent collars 39 with each other and with the adjacent spools including spool 36 and banking collar 35. Helical springs may be used in place of collars 39. Such springs would have a determined compressive bias, and as interspaced between the spools would provide a slightly resilient drive for the spools sequentially along the shaft.

In the lower portion of tank 30 there is disposed an elevator generally designated 40 which includes a horizontal member 42 having an up-turned end which supports one end of a shaft 43. The other end of this shaft is carried by a boss 44 extending laterally from a header 45. A series of spools 32 are likewise carried on shaft 43. This shaft may be thought of as a lower shaft in contrast to shaft 31 taken as an upper shaft, and in the embodiment of the present invention shown in FIGS. 1 and 2 may be considered a dead or non-rotating shaft with spools 32 which it carries turning freely with respect to it. However, if particular circumstances such as film strength make it desirable shaft 43 could be mounted in bearings in support 42 and header 45, and spools 32 could be attached to the shaft or could be left free turning with the shaft itself either having or lacking a power drive. All of these arrangements are known to the prior art and no novelty is ascribed thereto except as the modulating drive of the present invention is associated with them and adapted to accommodate the variable operating factors found with these various film transport mechanisms.

Referring in particular to FIG. 2 it is to be noted that the right-hand side of elevator assembly 40 includes a channel element 47 mounted on the inner surface of tank 30. This element is shaped and sized to engage and retain within U-formed leg end portions a set of four rollers 48 arranged in upper and lower pairs. These rollers are freely rotatable upon transverse shaft projections 49 carried on each end of header 45, and are sized to be freely movable up and down in the leg end portions of the channel element. Correspondingly, boss 44 is sized and located on header 45 to be freely movable in the opening between the leg ends of channel 47. Elevator assembly 40 is weighted appropriately either integrally or by external attachment for any given processing circumstance of the film, full liquid immersion, exposure to liquid spray, exposure to a drying atmosphere, etc., to provide a proper basic tension in the film wound helically between and around the spools on upper and lower shafts 31 and 43, as the film extends and is transported through the whole processing apparatus.

Referring to both FIGS. 1 and 2 it is to be noted that a control rod 50 extends upwardly from elevator assembly 40. This rod passes freely through the top panel of tank 30, and at its upper end is operatively engaged with a modulating drive flow control valve generally designated 52. This valve is more fully described in connection with FIGS. 3 through 9. It is to be noted particularly, however, in connection with FIGS. 1 and 2 that as the tension in film being transported over the various spools increases the elevator assembly 40 and control rod 50 are moved upwardly by action of the film, and as tension in the film is reduced the elevator assembly and the control rod are moved downwardly by gravity.

Referring next to FIG. 3 it is to be noted that modulating drive flow control valve 52 shown therein includes a housing 54 which encloses a contoured cylindrical spool 55 having tapered ends and a central portion 56 reduced in diameter. Lands or full diameter portions 57a and 57b respectively above and below reduced portion 56 are sized to a close sliding fit in the bore of housing 54 and act as gas or fluid seals therein. As shown, spool 55 is mounted on control rod 50 close to the upper end thereof so that as this rod is moved the spool attached to it is also moved in correspondence to the movement of the elevator, and thus in correspondence to the tension in the film as above described. In the modulating flow control valve of FIG. 3 the upper end of rod 50 is threaded to accept a nut 58 which retains a compression spring 60 between itself and the top surface of housing 54, thus giving the elevator assembly a resilient suspension. Adjustment of nut 58 sets the elevator 40 at a final desired position considered to correspond to normal tension in the film and a given length of film in the tank at any one time.

In practice, the mount for valve 52 is preferably a bracket permitting gross vertical adjustment of the position of the valve and hence to a considerable extent of the elevator assembly, with fine adjustment of elevator position being effected by manipulation of nut 58.

A vent 61 of determined size is provided in the side wall of housing 54. As shown, this vent is enlarged for the purpose of illustration. Opposite this vent there is a flow connection opening 62 for passage of pressurized fluid or pull of vacuum. A pipe or tube 63 as seen in FIG. 1 leads from opening 62 to diaphragm slip clutch 38. In the lower portion of housing 54 there is an inlet opening 64 to which is connected a pipe 65 as shown in FIG. 1 which is further connected at its distant end to a source of fluid under pressure. In the upper portion of housing 54 there is an outlet opening 67 to which is connected a pipe 68 which is further connected at its distant end to a vacuum source or system. As valve spool 55 is carried upwardly by elevator rod 50 on account of increased film tension its lower land 57b is moved past opening 62. Fluid under pressure entering port or opening 64 then flows through opening 62 and pipe or conduit 63 to slip clutch 38 so as to speed up the rotation of the spools on upper shaft 31 in a manner hereinafter described. This speed-up causes more film to be present in the tank at a given time thereby reducing the tension in the film. As the tension is decreased the elevator is allowed to descend carrying spool 55 downwardly until upper land 57a passes opening 62 placing clutch 38 in communication with a source of vacuum through opening 67. This causes a slowing down of the upper shaft spools and an increase in film tension. The foregoing operation cycle is more fully described in conjunction with the detailed description of the slip clutch.

Figure 4:
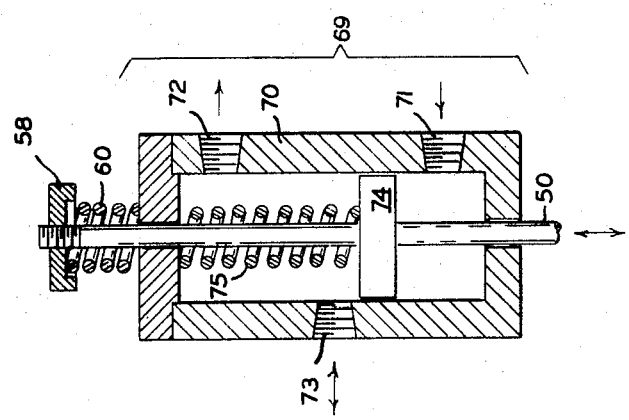
FIG. 4 represents a sectional side view of another modulating drive flow control valve.

Referring next to FIG. 4 there is shown another modulating drive flow control valve 69 somewhat similar to valve 52 but differing in that it has an internal spring means and no separately defined vent. Valve housing 70 has a pressure inlet opening 71, a vacuum outlet opening 72, and a flow connection opening 73. The valve spool in this particular embodiment is a cylindrical disk or relatively short cylinder 74. This disk is surmounted by a compression spring 75 which has a bias sufficient to offset at least a substantial part of the lifting effect of pressurized fluid from port 71 against the undersurface of disk or spool 74. When in the desired normal balance the spring 75 maintains disk or spool 74 slightly below flow connection opening 73. The spring 75 also acts as a damping means to reduce cycling or hunting of the elevator in its vertical movement.

Referring next to FIGS. 5 and 6 there is shown a modulating drive flow control valve 76 which does not in and of itself include any means such as nut 58 and spring 60 for providing floating support for a film processing machine elevator. Accordingly, valve 76 may only be used where some means independent of it is available for supporting the elevator such as, for example, photographic film itself of sufficient strength wound between upper and lower spool-carrying shafts in a processing machine. In FIG. 5 it is to be noted that elevator control rod 50a has a reduced diameter portion 77 a short distance below its upper end. This rod has a close sliding fit in a sleeve 78 which is preferably made of Teflon. The sleeve itself is enclosed in a body member 80 having three lateral passageways or ports designated 81, 82, and 83 defined in it. As shown particularly in FIG. 7 the sleeve 78 has a portion of its wall cut away at 84 to put the interior of the sleeve in communication with port or passageway 82. In like manner other portions of the sleeve wall are cut away to coincide with passageways or ports 81 and 83. In keeping with arrangements described hereinbefore, port 81 may be considered a pressure inlet opening, port 82 a flow connection opening, and port 83 a vacuum outlet opening. Movement of the upper portion of rod 50a alternatively provides flow paths between ports 81 and 82 and ports 82 and 83.

An upper end plate 85 bored to allow free passage of rod 50a forms a cover and retainer for sleeve 78, and is grooved to provide a seat for a dust cover 86 which may be pressed in place or otherwise mounted in the end plate. This cover has a vent hole 87. There is a lower end plate 88 substantially similar to the upper end plate with each end plate being attached to body member 80 in any conventional manner such as by means of flat head screws 89. The shoulder-to-shoulder distance along rod 50a wherein the total reduced portion 77 includes the uniformly reduced section and the tapering sections on its ends is the same length as the center-to-center distance from port 81 to port 83. As this reduced portion passes partly or completely in front of ports 81 or 83 a modulation of pressure in the line from flow connection opening 82 occurs which is in relation to the height of the elevator and hence in relation to the tension in the film. The tapered end sections of reduced rod portion 77 provide flow metering effects as they move past the cut away regions of sleeve 78.

Figure 7:
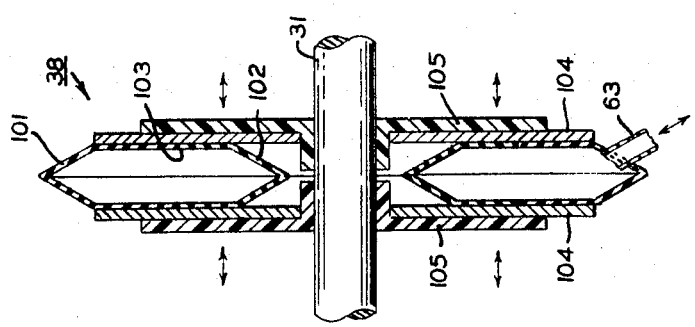
FIG. 7 represents a sectional side view of a bellows-type slip clutch adapted for use with and responsiveness to a flow control valve.

Referring next to FIG. 7, bellows slip clutch 38 is shown as including an outer resilient member 101. This member is preferably of neoprene, and is molded in a circular shape with a cross-section having a V-shaped outer circumferential region and parallel leg or planar portions extending inwardly therefrom. It abuts a generally similar but concave outwardly inner resilient member 102 along interfaces 103, and is preferably although not necessarily secured to the inner member therealong. It is to be noted that outer resilient member 101 has an opening defined in its outer periphery wherein one end of tube 63 is secured. This tube or pipe, of course, may be attached to member 101 as by cement or other suitable means to create a fluid-tight joint for pressurizing or depressurizing the interior region of the bellows defined by flexible members 101 and 102. As preferably assembled, flexible members 101 and 102 are attached by cement or the like to disc-like metal members designated 104. These members being side thrust and bellows retaining plates often exposed to corrosive conditions preferably, and as reduced to practice actually, are made of stainless steel of the non-magnetic type. Tube 63, of course, could be brought in through one of these plates and through flexible member 101. Extending outwardly from shaft 31 and supporting these end plates 104 are flanged plastic bearing and thrust transmitting members 105 which are preferably made of Teflon or other material having a very low coefficient of friction. The bores of the bearing portions of these members are adapted to allow them to be rotatably seated upon and slide along shaft 31. Tube or pipe 63 is restrained against flexing by suitable struts or bracing means (not shown) in such a manner that it serves to maintain the entire slip clutch 38 in a non-rotating relationship to film tank 30 with shaft 31 freely rotatable within the bores of members 105.

As pressure is applied to the bellows region of slip clutch 38 plates 104 are both urged outwardly away from each other pushing bearing members 105 ahead of them, and thereafter as the pressure in the bellows region is reduced these plates will be pulled inwardly toward their normal position by elastic contractive action of resilient members 101 and 102. When vacuum is applied to the bellows region side thrust plates 104 are drawn inwardly toward each other. With no bellows pressure exerted on them through plates 104, the flange portions of members 105 will have little or no functional engagement with adjacent spools 32 and 36. It is understood that essentially all of the absolute motion of the component parts of bellows slip clutch 38 is to the left as seen in FIG. 1 as this clutch is pressurized since on its right-hand side the clutch is adjacent spool 36 which is fixed to shaft 31.

Referring next to FIGS. 8, 9 and 10 there is shown a bellows type slip clutch 109. As is brought out in greater detail in connection with the description of FIGS. 11, 12, and 18, this clutch functions in the first instance to modulate the speed of upper shaft 31 itself rather than the speed or speeds of the several spools upon this shaft. In the assembly of clutch 109 a collar 110 is attached to shaft 31 by means of a set screw 111. A flat plastic thrust bearing 112 which is free on shaft 31 and adjacent collar 110 partially encloses a metal washer 113 which is also free on the shaft. This washer lies adjacent a second free flat plastic thrust bearing 114. The plastic bearings 112 and 114 are preferably of Teflon or another material having a low coefficient of friction, while metal washer 113 is preferably of non-magnetic stainless steel. A double bellows member 115 preferably made of rubber or other fluid-retaining resilient material may be molded or otherwise made of one piece or may be molded of two pieces. When of two pieces the bellows includes inner and outer generally U-shaped portions, the center part of each of which is partially folded upon itself. The bellows is provided with at least one fluid flow opening through one of the side walls to the interior cavity of the bellows, this opening, not shown, being located to mate with a similar opening in a bellows retaining means described below.

The side walls of the molded bellows are clamped in place by means of two retaining rings 116 shown in detail in FIG. 9. Each ring 116 is characterized by tapped holes 117 which may be four in number. Between the holes 117 there are spring-retaining hooks 118 which are small metal tabs bent into a flattened or thin channel shape as shown in section in FIG. 10. One end of each tab 118 is affixed to its base ring at point 119, with the tab's other end being bent down close but not attached to the face of the ring. Also to be noted in ring 116 in FIG. 9 is a fluid flow opening 120 which is provided in at least one of the rings 116 of a given clutch assembly 109 for alignment with the aforementioned opening in bellows 115 so that a tube or conduit constituting a fluid flow conductor from the interior of the bellows element of the slip clutch may be attached to the flow connection opening of one of the valves 52, 69, 76, or 90 described above. A pair of circular metal end members 121 provide rigid side supports for bellows 115, these end members having clear holes through them for the passage of fillister-head cap screws 122 seen on the left-hand side of FIG. 8 and flat head screws 123 seen on the right-hand side in FIG. 8 which are threaded into holes 117 in rings 116 whereby these rings, the bellows, and the end members are clamped together. Also attached by means of flat head screws 123 is a pressure plate 124 which is preferably made of Teflon and is both free turning and free sliding with respect to shaft 31. A bearing 125 which also is preferably made of Teflon is provided to carry the bellows assembly including end members 121 and pressure plate 124 on shaft 31. This bearing preferably has a press fit within one of the end members and a free turning fit on shaft 31.

Collar 110 provides a stop reference so that all expansive movement generated by pressure applied to the interior of double bellows 115 causes pressure plate 124 to move outwardly or to the right. Likewise, when vacuum is applied to the interior of the bellows the pressure plate is drawn back leftwardly. As the action or movement to be generated by the bellows, that is, its expansion and contraction needed to move pressure plate 124 into and out of operating position, need be and preferably is only very slight, urging or moving of the pressure plate to the left or retracted or non-operating position by the application of vacuum to the bellows 115 is made positive and particularly made even by an assist provided in the form of springs 126. The ends of these springs are attached by means of hooks 118 to one of the bellows retaining rings 116 and extend and are attached to corresponding hooks on the opposite retaining ring. The bellows assembly of slip clutch 109 is maintained in a non-rotating condition by means of the tube or conduit connection to the fluid flow opening 120 or by a support or brace, not shown, similar to means used to keep bellows slip clutch 38 non-rotative.

Referring next to FIGS. 11 and 12 there is shown a clutch and sprocket drive assembly 128 associated with shaft 31 with one or more of the spools 32 being fixedly attached to the shaft and the rotational speed of the shaft itself being made responsive to the action of modulating drive flow control valve 52. The bellows-type slip clutch assembly 109 shown in FIG. 8 is used to receive signals from flow connection opening 62 of the control valve. As seen in FIG. 12 the face of pressure plate 124 is adjacent a metal carrier disk 129 which is axially but not rotationally movable with respect to shaft 31. A composition friction disk 130 is fixedly attached to and carried by disk 129. The righthand side of the friction disk is adjacent a metal pressure plate 131 which is fixedly attached to a sprocket or gear wheel 132 mounted on bearings 133 to be freely rotatable with respect to shaft 31. The sprocket or gear wheel which is retained on the shaft by collar or snap ring 134 is driven at an essentially constant speed by a prime mover not shown. A tube or conduit 135 extends from the flow connection opening of control valve 52 to the opening in end member 121 of clutch assembly 109 in alignment with retaining ring flow opening 120.

A pressure signal transmitted to clutch assembly 109 from control valve 52 will move pressure plate 124 to the right pushing carrier disk 129 and friction disk 130 ahead of it with the friction disk coming to bear against pressure plate 131. This will generate at least some clutching action between sprocket wheel or gear 132 and shaft 31 with rotational slippage possibly taking place between disk 130 and plate 131, and such slippage definitely occurring between pressure plate 124 and carrier plate 129 because of the bellows portion of assembly 109 being restrained against rotation and carrier plate 129 being required to turn with shaft 31. The greater the fluid pressure applied to the bellows portion of clutch assembly 109 from the control valve through conduit 135 the greater will be the clutching action generated at the opposing faces of friction disk 130 and pressure plate 131 until, in the limit, there is no rotational slippage between this plate and this disk and shaft 31 is being driven at an angular speed equal to that of sprocket wheel 132. Conversely, clutching action may be diminished or in the end entirely and rapidly destroyed by relieving the fluid pressure applied to clutch assembly 109 or changing the pressure signal from control valve 52 to a vacuum signal, all as determined by the vertical movement of elevator control rod 50 in response to varying conditions of tension in the film being processed.

The drive modulation system of the apparatus arrangement of FIG. 11 may be compared with that of the arrangement of FIG. 1 so far as intermediate effects are concerned, although it is to be understood that an ultimate result of modulation of the speed of spools around which the film is passing is achieved in each case. In the case of FIG. 11, as described just above, the rotational speed of shaft 31 is modulated up to a peak value of the speed of sprocket wheel or gear 132 assumed to be turning at a constant speed, and the speeds of those spools 32 fixed to the shaft rise and fall with that of the shaft. In the case of FIG. 1, on the other hand, upper shaft 31 is assumed to be driven at a constant speed with spools 32 being free wheeling on it and with respect to each other in the absence of fluid pressure in bellows-type slip clutch assembly 38. As pressure is applied to this assembly from control valve 52 through conduit 63, however, the otherwise free wheeling spools 32 are compacted axially between the clutch assembly and banking collar 35, and this collar which is pinned to and turns with shaft 31 begins to impart some angular speed to these spools. With only light pressure transmitted to clutch assembly and only light packing of the spool array, there will still be discernible slip or difference in speed between spools 32 and the shaft, and indeed between various ones of the spools themselves. As clutch assembly 38 receives a stronger pressure signal, however, and the spool array is more tightly packed, both spool-to-shaft and spool-to-spool slip will decrease, and the rotational speeds of all of the spools will tend to approach that of the shaft. Contrarily, as a weaker pressure signal is transmitted from control valve 52 there will be more slip and a decrease in spool speeds.

Referring next to FIGS. 13 and 14 there is illustrated a film transporting spool assembly 138 adapted to exert a variable grip or pull on film passing around or over it. In this assembly a spool 139 which is fixedly mounted on shaft 31 has a plurality of evenly spaced radial passageways 140, for example, twelve such passageways. These passageways are formed in a solid web of the spool, and extend outwardly through the web which is enclosed by a film driving band 141 of material such as rubber. This band is provided with holes or openings aligned with the outer ends of the radial passageways in spool 139. Extending at right angles to passageways 140 are lateral connecting ports 142. These ports terminate at a recessed sealing face 143 on the spool which provides a sliding seat for a raised, ring-like portion 144 extending outwardly from the main body of a fluid distributing block 145. This block, which by itself is both axially and angularly movable with respect to shaft 31, is provided with a pipe connection 146 formed in the portion considered the bottom, as viewed, and with another pipe connection 147 disposed at about one-hundred-eighty degrees from the first connection.

A lateral or axial passageway 148 extends from lower connection 146 and terminates in a distributing duct segments 149 formed in the bearing face of raised, ring-like portion 144 and preferably having an arc length of about one-hundred and eighty degrees. A passageway 150 similar to passageway 148 extends from upper connection 147 and terminates in a distributing duct segment 151 similar to duct segment 149 but entirely distinct from it and having an arc length of only about one-hundred and forty degrees. Bearing against the right-hand or outer surface of block 145 is a compression spring 152 which has its other end engaged or retained by a stop collar 153. This collar is affixed to shaft 31 both rotationally and longitudinally. There is a plastic sleeve 154 on shaft 31 between block 145 and collar 153 which prevents wear of spring 152 on the shaft. The action of the spring is to urge block 145 against spool 139 and provide a firm running and sealing contact of ring-like portion 144 of the block on recessed surface 143 of the spool. As indicated in FIG. 16 the block and the spool are of approximately dissimilar materials. Block 45 is normally restrained against rotation by conduits coming to connections 146 and 147 so that shaft 31 rotates inside of the block. The conduits coming to the block should, however, have enough flexibility to allow at least slight axial movement of the block so that the action of spring 152 to press the block against the spool will be effective. Angular motion is imparted to shaft 31 by any suitable means not shown.

In use it is contemplated that fluid under pressure such as compressed air or pumped liquid including a film processing liquid fed in through lower connection 146 will be distributed to a least one-half or more of the radial passageways 140 in the spool at any given time. The particular passageways supplied with pressurized fluid are, of course, constantly changing as shaft 31 and spool 139 are rotated and successive lateral ports 142 are brought in way of distributing duct 149. It is contemplated further that a source of vacuum or at least a source of pressure lower than the pressure surrounding film transporting spool assembly 138 will be made available at upper connection 147. Thus the particular radial passageways 140 in communication with connection 147 at any given time are suction passageways tending to draw film 155 down more than usually snugly on band 141 as this film or film strip passes over the spool assembly, and thus enhance the grip or pulling effect of the assembly on the film. As a particular passageway 140 in communication with connection 147 through duct 151 and passageway 150 is carried around so that its associated connecting port 142 is in way of duct 149 rather than duct 151, it, the passageway 140, is changed from a suction passageway to a pressure or blow-off passageway and serves to cause a clean break away of film 155 from the spool assembly.

In certain film treatment steps the tank 30 is operated with a level of processing liquid carried to and above the tops of the spools on the lower shaft, although it may be below the spools on the upper shaft. When such is the case and the spool assembly of FIG. 13 is used on a lower shaft 43 its pipe connection 146 is disposed to be above the shaft and connection 147 below it. In certain other film treatment steps the tank 30 may be operated with a level of processing liquid carried to and above the tops of the spools on upper shaft 31. A spool assembly 138 may be carried on the upper shaft and in this case have the orientation shown in FIG. 13. Using a modulating flow control valve 52 actuated by an elevator control rod 50, the valve's flow connection opening 62 is joined to pipe connection 147 in spool assembly block 145 mounted on either the upper or the lower shaft. Inlet opening 64 of valve 52 is connected to the outlet or discharge side of a processing liquid circulating pump while outlet opening 67 of the valve is connected to the suction or inlet side of the pump. To complete the system, a bypass conduit teed out of the line between the discharge side of the pump and the inlet opening of the valve is carried to pipe connection 146 of spool assembly 138. As the elevator and elevator rod descend because of undue slacking of the film, a greater suction is caused to be exerted at connection 147 of the spool assembly to provide a greater driving grip and pull on the film and an increase in film speed and tension. As the elevator and its control rod rise a contrary effect is achieved.

A drive modulation system using film transporting spool assembly 138 of FIG. 13 differs from that of the apparatus arrangement shown in either FIG. 1 or FIG 11 in that it does not contemplate that there will be any modulation of the speed of the spool around which a strip-like material such as photographic film is passing and by which it is being driven. Rather it contemplates that there will be some imperfection in the grip of the spool assembly's tractive surface, the outer surface of film driving band 141, on the film, with consequent slip between this surface and the film as the linear speed of the film lags behind that of the driving band. Exertion of suction through those radial passageways which are in flow communication with pipe connection 147 through distributing duct 151 at any given time will improve the grip of the driving band on the film and decrease the slip between the film and the band with the linear speed of the film increasing to approach that of the band. With increased film speed there will be correspondingly increased film tension. It is of course, conceivable, although not representing the usual case, that even in the absence of a suction effect the driving band of a film transporting spool assembly 138 will provide too strong a pull on the film; that is, there will not normally be enough slip. In that case, a modulated fluid pressure rather than a modulated vacuum could be exerted at pipe connection 147 in block 145 to tend to push or blow the film off of the driving band in its active, pulling arc segment.

Referring next to FIGS. 15, 16 and 17 there is illustrated another film transporting spool assembly 158 adapted to exert a variable grip or pull on film passing around or over it. In this assembly there is a spool member 159 which is fixedly mounted on shaft 31 and has a central core, disposed between tapered end flanges, which is enclosed by a film driving band 160 of a material such as rubber. A segment of a film strip 161 is shown passing over and around the driving band. Disposed above and partially enclosing driving band 160 is a fluid distribution chamber 162 of arcuate form. The lower arc panel 163 of this chamber is characterized by a multiplicity of perforations 164 and is in such spaced relation to the driving band that there is only slight radial clearance between it and film strip 161. The width of the distribution chamber as seen in FIG. 15 is such that it fits quite closely between the end flanges of spool member 159. On its upper arc panel 165 chamber 162 is provided with a mounting or attaching bracket 166 from which a pair of studs 167 extend upwardly through appropriately located holes in the top panel of processing tank 30. There are two nuts 168 on each of these studs, one above and one below this panel, which serve to support and secure the fluid distribution chamber from and within tank 30, and allow its vertical adjustment to obtain the proper clearance between perforated chamber panel 163 and the film strip. An access opening through upper panel 165 of chamber 162 and bracket 166 aligned with a suitably sized opening in the top panel of tank 30 allows a fluid flow conduit 169 to be connected to the interior of the fluid distribution chamber for the pressurizing or depressurizing of this chamber. This conduit may extend to the flow connection opening 62 of a modulating flow control valve 52.

With shaft 31 and spool member 159 turning at a constant speed it may be assumed that there is some slip between driving band 160 and film strip 161 when reliance for driving friction is placed only on the radial pressure of the film on the driving band due to tension in the film, considered, of course, with the coefficient of friction between the band and the film strip. Driving friction may be increased and slip reduced, that is, film strip 161 may be accelerated, by supplying fluid under pressure to the interior of chamber 162 through conduit 169. This fluid, still under at least some pressure, will flow out of the chamber through perforations 164 and impinge upon the film passing over the driving band before it, the fluid escapes into tank 30 around the lower edges of chamber 162. Pressure of the escaping fluid on the film will increase the pressure of the film on the driving band and consequently increase the pull of the band on the film and decrease the slip by acceleration of the film. Contrarily, if vacuum be applied to the interior of the fluid distribution chamber there will be a suction effect exerted on film strip 161 through perforations 164 with the film tending to be lifted off the driving band, the driving effect decreased, and slip increased as film speed becomes less.

Referring next to FIG. 18 there is shown a combination-type modulating drive used on a single upper shaft 31 which includes a bellows-type slip clutch and sprocket drive assembly 128 in the manner of FIG. 11 and a film transporting spool assembly 138 having a fluid-actuated film gripping and releasing means in the manner of FIG. 13. High and low pressure or vacuum signals are transmitted to drive assembly 128 from a modulating drive flow control valve 52 just as shown in FIG. 11 while pipes or conduits 171 and 172 are joined to connections 146 and 147 in block 145 of spool assembly 138 for supplying and withdrawing of fluid for film grip modulation purposes. These pipes may be considered to be part of a film processing liquid pumping circuit as described in connection with FIG. 13. Flow through such a circuit may be regulated by a second valve 52, not shown, which may be actuated by an elevator control rod 50 separate from the rod which is illustrated, or which may indeed be placed in tandem with the illustrated valve on the same control rod. The particular combination-type modulating drive shown in FIG. 18 is provided for purposes of example only, that is, for showing that the several particular drive modulation systems or means illustrated and described herein are amenable to use in combination. Combinations other than the one illustrated will suggest themselves to those skilled in the art with the particular combination used in any given case depending on the circumstances of that case such as preferred film speed and tension, coefficients of friction between the film and the spool surfaces over which it is running, fineness of control required, etc.

Referring next to FIG. 19 there is shown a diaphragm assembly 175 including a slip clutch for providing a modulated drive to a film-carrying spool. Upper shaft 31 has mounted on its end outside of tank 30 a sprocket wheel 176 which may be rotated by a roller chain from a power source not shown. This sprocket is secured to shaft 31 by a key 177 so that the shaft, is positively rotated at an assumed constant speed as the sprocket is driven. Diaphragm assembly 175 which is inside tank 30 includes a diaphragm chamber end plate 178 within which shaft 31 has a free turning fit. This end plate is fixedly fastened to an interior vertical wall surface of the tank by a bracket 179, and has a fluid conduit connector fitting 180 threaded into it with one end of this fitting extending through the tank wall at an opening wherein it has substantial clearance. The face of end plate 178 distant from the tank wall is characterized by a circular recess 181 over which there is fastened a flat, resilient, and centrally open diaphragm 182. This diaphragm is secured to the end plate by means of inner and outer retaining rings 183 and 184 and a suitable number of cap screws 185. Accordingly, a diaphragm pressure or vacuum chamber is defined in circular recess 181.

A pressure plate 186 within which shaft 31 is freely rotatable and which is freely axially movable along the shaft is fastened to the right-hand side of diaphragm 182 by means of a plurality of flat head screws 187 which pass through the diaphragm and thread into a retaining ring 188 within the diaphragm chamber. In axially spaced relation to the diaphragm or clutch assembly as so far described there is a banking collar 189 fixedly fastened to upper shaft 31 by means of set screw 190. A friction or clutch ring 191 is fastened to the left-hand side of collar 189 by means of a plurality of flat head screws 192, and there is a conical or Belleville-type spring 193 retained within the central opening 194 of this ring and itself having a sufficiently large central opening that it may flex freely along shaft 31. Adjacent the crown side of spring 193 there is a flanged or rimmed thrust transmitting ring 195 which partially encloses a short flanged sleeve bearing 196 on shaft 31, ring 195 and bearing 196 together being both freely rotatable and axially movable with respect to the shaft. At its non-flanged end, bearing 196 is in close juxtaposition to the corresponding end of long flanged sleeve bearing 197 which abuts pressure plate 186 at its flanged end. Bearing 197 like bearing 196 is both freely rotatable and axially movable with respect to shaft 31. Likewise, at its flanged end, bearing 197 is freely rotatable with respect to pressure plate 186.

Carried upon the elongated or non-flanged portions of sleeve bearings 196 and 197 is a spool assembly 198 which may be freely rotatable with respect to these bearings but which may also be and indeed preferably is sufficiently snugly fitted around them that it and the bearings are all rotatable as a unit with respect to shaft 31. The spool assembly itself comprises a core member 199, an enclosing film driving band or sleeve 200, and left-hand and right-hand flanges or end pieces 201 and 202 with sets of countersunk flat head screws 203 securing the flanges to the core member. Right-hand spool flange 202 is made appreciably thicker than left-hand flange 201 so that it will have sufficient strength or rigidity and capacity for wear to act as a clutch plate or ring subjected to both thrust and torque.

The normal action of Belleville spring 193 is to keep spool assembly 198 and its bearings 196 and 197 moved relatively to the left as shown in FIG. 19, that is, with the spool's right-hand flange 202 out of contact and hence out of any clutching engagement with friction ring 191 which is turning at the angular speed of upper shaft 31. Conduit connector fitting 180 may be joined by suitable conduit means to flow connection opening 62 of modulating drive flow control valve 52 and pressure or vacuum signals transmitted therethrough and therefrom to diaphragm chamber 181. A build-up of pressure in this chamber causes diaphragm 182 to be deflected to the right pushing pressure plate 186, sleeve bearings 196 and 197, and spool assembly 198 ahead of it aginst the force of spring 193 until contact is made between adjacent faces of spool flange 202 and friction ring 192. This contact effects at least some clutching engagement between ring 191 and flange 202 with the result that the spool assembly and its bearings which have heretofore been standing absolutely still, except as some torque may have been transmitted from spring 193 to thrust transmitting ring 195 engaged with sleeve bearing 196, begin to have some angular speed imparted to them.

When there is only a relatively light positive fluid pressure in diaphragm chamber 181 the contact pressure between spool flange 202 and friction ring 191 will also be light, and there may be some slip or difference in angular speel between the spool assembly and the shaft, especially as rotation of the spool is retarded by the drag or backward pull of a strip of film 204 passing over and around it. Higher fluid pressure in the diaphragm chamber, however, may eliminate this slip and cause the spool assembly to be accelerated to the full angular speed of friction ring 191 and shaft 31. A relief or diminution of pressure in the diaphragm chamber, on the other hand, allows Belleville spring 193 to push the spool assembly to the left with flange 202 going out of contact with friction ring 191 and clutching engagement and drive to the spool assembly and the film passing over it being thereby disrupted. Such disruption can be effected very rapidly by applying a vacuum to diaphragm chamber 181 to draw pressure plate 186 to the left by diaphragm action leaving the leftward shifting of only the spool assembly and its bearings to be effected by the force of spring 193.

Referring next to FIG. 20 there is shown a fragment of a slip clutch mechanism of the type shown in FIG. 19 slightly modified to use a coil spring rather than a Belleville or conical spring to maintain the clutching or frictionally engageable surfaces or members out of contact. In this modification a banking collar 206 having a central chamber or cavity 207 is fixedly fastened to shaft 31 by means of set screw 208 and therefore turns at the speed of the shaft which is assumed to be driven at a constant speed by means not shown. A friction ring 209 is fastened to the left-hand side of collar 206 by means of a plurality of flat head screws 210. Mounted freely on shaft 31 within cavity 207 are an essentially friction-free thrust washer 211 immediately adjacent the cavity end surface of banking collar 206 and centrally shouldered but otherwise ordinary washer 212 adjacent the thrust washer.

The shoulder on washer 212 serves as mounting and locating means for one end of a coil-type compression spring 213 surrounding but out of contact with shaft 31. The other end of this spring bears against a plain washer 214 which is in a stack of washers including as well a friction-free washer 215 and plain washer, washers 214, 215, and 216 all being freely mounted on shaft 31, and washer 216 being adjacent and exerting thrust against the right-hand side of spool flange 202. It is to be noted that short flanged sleeve bearings 196 is not present in the assembly shown in FIG. 20. Functionally, the mechanics of the spring means shown in FIG. 20 are just the same as those of the spring means shown in FIG. 19 so far as they relate to the action of the diaphragm assembly which could be repeated exacting from figure to figure.

Referring next to FIGS. 21 and 22 there is shown a fragment of a slip clutch mechanism of the type shown in FIG. 19 slightly modified to use a specially shaped right-hand flange of the spool assembly itself as a spring means rather than a separate resilient member such as Belleville spring 193 to maintain the clutching or frictionally engageable surfaces or members substantially out of contact. In this modification the pool assembly 218 includes a quite thin and slightly dish-shaped right-hand flange 219 which is fastened to core member 199 by a plurality of flat head screws 220. The dished edge or peripheral portion of flange 219 extending outwardly beyond film driving band 200 is inclined at least somewhat toward banking collar 189 carrying friction ring 191. The thinnest portion of flange 219 occurs at the bottom of an arcuately undercut region on its side adjacent the stop collar and generally at a radius beyond the surface radius of the driving band. Further out on the side of flange 219 adjacent banking collar 189, that is, beyond the arcuately undercut region of this flange, there is fixedly fastened a friction or clutch ring 221 disposed to be in face-to-face alignment with banking collar friction ring 191.

As may be seen particularly in FIG. 22, clutch ring 221 is at least slightly wedge-shaped in radial cross section so that with right-hand flange 219 in essentially free or undeflected condition as shown the face 222 of ring 221 immediately opposite the working face of friction ring 191 is in inclined or nonparallel relation to the latter face. When spool assembly 218 is moved to the right by application of positive fluid pressure to diaphragm assembly 175 contact between the two clutch or friction rings is made initially along the outer right-hand edge of ring 221. As fluid pressure within diaphragm chamber 181 is increased to press the clutch rings harder together, the peripheral portion of spool flange 219 is resiliently flexed back on itself at its undercut region, bringing face 222 of clutch ring 221 more nearly into parallel relation with the active face of clutch ring 191 as driving engagement between the two rings is effected across more and more of the area of face 222.

Upon there being any substantial contact between clutch rings 221 and 191 at least some driving torque will be transmitted to spool assembly 218 from shaft 31, banking collar 189, and clutch ring 191, all of which are assumed to be turning at essentially constant speed. With sufficient pressure in diaphragm chamber 181 to force clutch ring 221 into firm, flattened out or full area contact with ring 191, the spool assembly will be accelerated rotationally to the full angular speed of the shaft; that is, there will be no slip between the two clutch or friction rings. When positive fluid pressure within diaphragm chamber 181 is diminished or discharged or possibly even changed to a vacuum relieving the rightward thrust of pressure plate 186 against flanged bearing 197 and hence against spool assembly 218, the peripheral portion of spool flange 219 will flex back to its normal or free shape, shifting the spool assembly slightly to the left, and the contact area as well as the contact pressure between friction or clutch rings 221 and 191 will be so diminished that driving torque is no longer transmitted to the spool assembly from the latter clutch ring.

Referring finally to FIGS. 23, 24 and 25 it is to be noted that in each of these a plurality of tanks 30 are arranged with their long sides at least parallel if not contiguous with each other and the spools therein arranged to transport film in an overall left-to-right direction as it undergoes processing. As film strip 224 is fed into the farthest left tank of FIG. 23 it engages an end spool on the upper shaft therein, and then is threaded from the upper to the lower then to the upper shaft spools in a helical manner, and from the last upper shaft spool it is fed to the second tank at the same end. After the film has been transported helically to the other end of the second tank it is directed from the last upper shaft spool therein to an upper shaft spool in the third tank. In this manner the feed of the film is directed through all succeeding tanks. This film is intended to travel at a rather rapid rate and there is usually a great amount of film in process in the various tanks taking in the whole structure of a processing apparatus. The various particular or individual processes to be performed determine the amount of the film and the number of tanks as well as the type of processing fluids or materials therein. So far as transport of the film is concerned, paths similar to that shown in the apparatus arrangement of FIG. 23 are followed in the arrangements of FIGS. 24, and 25.

In each tank 30 of the apparatus arrangements of each of FIGS. 26, 27, and 28 a modulating drive flow control valve 52 is shown associated with the film transporting spool array or bank therein. This association may be considered to be of the kind shown in FIG. 1 so far as each valve's being mechanically actuated by a control rod coming up from the elevator carrying the bank's lower spool shaft in the same tank is concerned. The association of FIG. 1 is further of the kind shown in FIG. 23 in that in the latter figure the fluid signal output pipe or tube 63 from each valve 52 goes to a clutching device such as a bellows-type slip clutch 38 on the upper shaft of the same film spool bank as the one of which the elevator control rod actuates the valve. Thus the film spool bank in each tank 30 of the arrangement of FIG. 23 is self or integrally modulating with respect to tension and speed of film being transported through or across it.

The fluid signal transmission system of FIG. 1 is not the only one, however, which may be used within the contemplation of the present invention. In FIG. 24, for example, the signal output line from each modulating drive flow control valve 52 is connected to a clutching device in the film spool bank of the tank 30 next downstream in the direction of overall film travel except for the last valve 52 which is connected in signal transmitting relationship to a clutching device in the first tank's film spool bank. In FIG. 25, for another example, the signal output line from the first modulating drive flow control valve 52 goes to a use or receiving point not shown; the line from the second valve goes downstream to a clutching device in the fourth film spool bank; the line from the third valve goes upstream to a clutching device in the second film spool bank; the line from the fourth valve goes upstream to a clutching device in the first film spool bank, and a clutching device in the first film spool bank receives signals from a source not shown. Thus a wide range of control or modulating combinations is available within the contemplation of the present invention, and the particular combination or combinations selected to be used in a given film processing operation and apparatus will generally depend upon a consideration of factors arising outside of the scope of the invention itself. It should, however, be noted that while only a single bank of film spools is shown within each tank 30 of the apparatus arrangements of each of FIGS. 23, 24, and 25, there may indeed be more than one bank of spools within a given tank with each bank within the tank being integrally modulating with respect to tension and speed of film being transported through or across it, or with a particular modulating drive control combination tying together and governing the operations of all of the banks.

In all of the preceding description it has been indicated that power drive to a film spool bank is applied at the bank's upper shaft 31. While the upper shaft is often the powered shaft, it is to be understood that lower shaft 43 may also be power driven. In this arrangement a power transmission shaft may be disposed vertically in tank 30, extending from above the top to close to the bottom thereof. At its upper end this transmission shaft may be connected to a prime mover through a spline coupling to allow the shaft to have vertical motion while at its lower end it is connected to lower film spool shaft 43 through bevel gears. A clutch responsive to signals from a control valve actuated according to the up and down movement of the elevator may be carried on the lower shaft so as to provide a modulated drive to the lower shaft's spools with reference to an assumed established angular speed of lower shaft 43 itself. Further, it may sometimes be desirable to apply a power drive to both the upper and the lower shafts of a given film spool bank with each of these shafts and/or the spool arrays on them having clutch mechanisms associated with them which are energized responsively to the vertical movement of the elevator of this bank and/or another bank or banks.

The present invention considered as a method provides steps whereby the tractive effect of a drive mechanism on strip-like material passing over or across it is regulated. In these steps, which are taken in response to tension in the strip-like material, regulation of driving traction may be effected in one or a combination of several ways. These include modulating the speed at which spools rotate over which the strip-like material is passing either by modulating the speed of the shaft on which the spools are carried or by modulating the slip of the spools with respect to their shaft turning at an established or constant speed. They also include modulating the grip of the driving surfaces of the spools on strip-like material passing over the spools by modulating contact pressure between the strip-like material and these driving surfaces. Modulation in either case is effected by the output in the form of either continuous flow, static or closed end flow, or vacuum pull, or a combination of them from a flow control valve with the position and movement of this valve being determined by the setting and motion of an elevator carrying spools around which the strip-like material travels or runs. Elevator movement in turn is a function of the tension in the strip-like material or film, and in its effect on valve movement serves to modulate the tractive effect of the drive mechanism to maintain the film tension at or restore it to a normal value.

Protection by Letters Patent of this invention in all its aspects as the same are set forth in the appended claims is sought to the broadest extent that the prior art allows.

I claim as my invention:

1. In an apparatus for transporting strip-like material wherein said material is wound helically from shaft to shaft over spools carried on a plurality of shafts in spaced relation one to another with at least one of said shafts being movable in space in response to changes in tension in said material and at least one of said shafts being adapted for operative engagement with a prime mover, a modulating drive comprising (1) a flow control value actuated by movement of said movable shaft and adapted to generate a fluid signal responsive to said movement, (2) means for receiving signals from said valve, said means being associated with said shaft adapted for engagement with a prime mover and said means being adapted to regulate the tractive effect of at least one spool on that shaft on strip-like material passing over it according to said signals, and (3) a fluid flow conduit connecting said flow control valve and said receiving means.

2. A modulating drive for strip-like material according to claim 1 in which said flow control valve is adapted to generate fluid signals of both pressure and vacuum depending upon the position of said movable shaft.

3. In an apparatus for transporting strip-like material wherein said material is wound helically from shaft to shaft over spools carried on a plurality of shafts in spaced relation one to another with at least one of said shafts being vertically movable in response to changes in tension in said material and at least one of said shafts being adapted for operative engagement with a prime mover, a modulating drive comprising (1) a flow control valve having an internal movable member and adapted to generate a fluid signal, (2) means connecting said movable shaft with the internal movable member of said valve whereby the movement of said member and the signals generated by said valve are rendered responsive to the vertical movement of said shaft, (3) means for receiving signals from said valve, said means being associated with said shaft adapted for engagement with a prime mover and said means being adapted to regulate the tractive effect of at least one spool on that shaft on strip-like material passing over it according to said signals, and (4) a fluid flow conduit connecting said flow control valve and said receiving means.

4. A modulating drive for strip-like material according to claim 3 which further comprises resilient means providing support for said vertically movable shaft through said means connecting that shaft with the internal movable member of said flow control valve.

5. In an apparatus for transporting strip-like material wherein said material is wound helically from shaft to shaft over spools on a plurality of shafts in spaced relation one to another with at least one of said shafts being movable in space in response to changes in tension in said material and at least one of said shafts being adapted for operative engagement with a prime mover and having at least one spool freely rotatably and axially movably mounted upon it, a modulating drive comprising (1) a flow control valve to generate a fluid signal removable shaft and adapted to generate a fluid signal responsive to said movement, (2) a banking member against which said spool may be axially moved fixed mounted on said shaft adapted for operative engagement with a prime mover, (3) means for receiving signals from said valve, said means being adapted to exert thrust against said axially movable spool to urge it against and into frictional engagement with said banking member whereby when said banking member and the shaft upon which it is mounted are being rotated by a prime mover at least some rotational speed is imparted to said axially movable spool, this rotational speed and the tractive effect of the spool on strip-like material passing over it being regulated by the force of said thrust, and (4) a fluid flow conduit connecting said flow control valve and said receiving means.

6. A modulating drive for strip-like material according to claim 5 in which said means for receiving signals from said flow control valve comprises a bellows disposed to be expanded to exert thrust against said axially movable spool to urge it against and into frictional engagement with said banking member while itself having negligible frictional engagement with said spool.

7. A modulating drive for strip-like material according to claim 6 in which said bellows is an annular bellows surrounding the shaft on which said axially movable spool is mounted, said shaft being freely rotatable within said bellows.

8. A modulating drive for strip-like material according to claim 5 in which said means for receiving signals from said flow control valve comprises a diaphragm disposed to be deflected to exert thrust against said axially movable spool to urge it against and into frictional engagement with said banking member while itself having negligible frictional engagement with said spool.

9. A modulating drive for strip-like material according to claim 8 in which said diaphragm is an annular diaphragm surrounding the shaft on which said axially movable spool is mounted, said shaft being freely rotatable within said diaphragm.

10. A modulating drive for strip-like material according to claim 5 which further comprises resilient means disposed between said spool and said banking member and tending to keep said spool out of frictional engagement with said banking member.

11. In an apparatus for transporting strip-like material wherein said material is wound helically from shaft to shaft over spools carried on a plurality of shafts in spaced relation one to another with at least one of said shafts being movable in space in response to changes in tension in said material and at least one of said shafts having at least one spool fixedly mounted upon it, a modulating drive comprising (1) a pressure plate freely rotatably mounted on said shaft having said spool fixedly mounted upon it, said pressure plate being adapted for operative engagement with a prime mover, (2) a friction disk and carrier means therefor axially movable but non-rotatably mounted upon said shaft having said spool fixedly mounted upon it so that said friction disk may be moved into contact with said pressure plate, (3) a flow control valve actuated by movement of said movable shaft and adapted to generate a fluid signal responsive to said movement, (4) means for receiving signals from said valve, said means being adapted to exert thrust against said friction disk and its carrier means to urge them against and into frictional engagement with said pressure plate whereby when said pressure plate is being rotated by a prime mover at least some rotational speed is imparted to said friction disk and its carrier means and said shaft having said spool mounted upon it and to the spool itself, this rotational speed and the tractive effect of the spool on strip-like material passing over it being regulated by the force of said thrust, and (5) a fluid flow conduit connecting said flow control valve and said receiving means.

12. A modulating drive for strip-like material according to claim 11 in which said means for receiving signals from said flow control valve comprises a bellows disposed to be expanded to exert thrust against said axially movable friction disk and its carrier means to urge them against and into frictional engagement with said pressure plate while itself having negligible frictional engagement with said friction disk and carrier means.

13. A modulating drive for strip-like material according to claim 12 in which said bellows is an annular bellows surrounding the shaft having said spool fixedly mounted upon it, said shaft being freely rotatable within said bellows.

14. In an apparatus for transporting strip-like material wherein said material is wound helically from shaft to shaft over spools carried on a plurality of shafts in spaced relation one to another with at least one of said shafts being movable in space in response to changes in tension in said material and at least one of said shafts being adapted for operative engagement with a prime mover, a modulating drive comprising (1) a spool fixedly mounted on said shaft adapted for operative engagement with a prime mover, said spool having at least one fluid flow passageway through it with one end thereof opening through the circumferential surface of the spool and the other end opening through a lateral surface of the spool, (2) a fluid distributing block freely rotatably mounted on the shaft on which said spool is mounted and disposed in contacting and rotatably sliding relation to said spool on the lateral surface thereof wherethrough said fluid flow passageway opens, said block having a fluid flow passageway of which one end is disposed to be connected to an external source of fluid signals and the other end is disposed to come into intermittent connection with the passageway through said spool as there is relative rotary motion between said spool and said block on account of rotation of said spool and the shaft on which it is mounted, (3) a flow control valve actuated by movement of said movable shaft and adapted to generate a fluid signal responsive to said movement, and (4) a fluid flow conduit connecting said flow control valve and said fluid distributing block at said one end of the passageway in said block wherethrough fluid signals are transmitted intermittently to and through the passageway in said spool and thence to said strip-like material, the grip of said spool on strip-like material passing over it and its tractive effect thereupon thereby being regulated according to the force and direction of these signals.

15. A modulating drive for strip-like material according to claim 14 in which said fluid distributing block has (i) a first fluid flow passageway of which one end is disposed to be connected to an external source of fluid signals at a first level of pressure and the other end is disposed to come into intermittent connection with the passageway through said spool as there is relative rotary motion between said spool and said block, and (ii) a second fluid flow passageway of which one end is disposed to be connected to an external source of fluid signals at a second level of pressure and the other end is disposed to come into intermittent contact alternately with said other end of said first fluid flow passageway with the passageway through said spool as there is relative rotary motion between said spool and said block.

16. In an apparatus for transporting strip-like material wherein said material is wound helically from shaft to shaft over spools carried on a plurality of shafts in spaced relation one to another with at least one of said shafts being movable in space in response to changes in tension in said material and at least one of said shafts being adapted for operative engagement with a prime mover and having at least one spool fixedly mounted upon it, a modulating drive including (1) a fluid distribution chamber having a perforated surface in closely spaced relation to the circumferential surface of said spool and of an arcuate length and disposition corresponding closely to the arcuate length and disposition of the path in space in which strip-like material normally runs in contact with the circumferential surface of said spool, (2) a flow control valve actuated by movement of said movable shaft to generate a fluid signal responsive to said movement, and (3) a fluid flow conduit connecting said flow control valve and said fluid distribution chamber wherethrough fluid signals are transmitted to and through the perforated surface of said chamber and thence to said strip-like material, the grip of said spool on strip-like material passing over it and its tractive effect thereupon thereby being regulated according to the force and direction of these signals.

17. In the operation of an apparatus for transporting strip-like material wherein said material is wound helically from shaft to shaft over spools carried on shafts in spaced relation one to another with at least one of said shafts being movable in space in response to changes in tension in said material and at least one of said shafts and a spool thereon being rotated by a prime mover, a method of modulating the drive which includes the steps of (1) generating fluid signals in response to movements of said movable shaft, and (2) using these signals to regulate the tractive effect of said spool rotated by said prime mover on strip-like material passing over this spool.

18. A method of modulating the drive of strip-like material according to claim 17 in which said signals are used to regulate the speeds of both the shaft and the spool rotated by said prime mover with reference to the speed of the prime mover.

19. A method of modulating the drive of strip-like material according to claim 17 in which said signals are used to regulate the speed of the spool on said shaft rotated by said prime mover with reference to the speed of the shaft.

20. A method of modulating the drive of strip-like material according to claim 17 in which said signals are used to regulate the grip of the circumferential surface of the spool rotated by said prime mover on strip-like material passing over this spool by varying the contact pressure between this material and this surface.

References Cited
UNITED STATES PATENTS

| | | | |
|---|---|---|---|
| 2,020,640 | 11/1935 | Guenther. | |
| 2,210,880 | 8/1940 | Capstaff | 95—94 |
| 3,322,315 | 5/1967 | Eberlin | 226—44 |
| 3,330,457 | 7/1967 | Foster et al. | 226—44 |

ANDRES H. NIELSEN, Primary Examiner

U.S. Cl. X.R.

226—44

UNITED STATES PATENT OFFICE
CERTIFICATE OF CORRECTION

Patent No. 3,474,945                          October 28, 1969

Victor Takata

It is certified that error appears in the above identified patent and that said Letters Patent are hereby corrected as shown below:

Column 2, line 3, between "ported" and "the" insert -- through --. Column 5, line 40, "9" should read -- 6 --. Column line 57, "7" should read -- 6 --. Column 8, line 29, cancel ", 90". Column 10, lines 19 and 20, "segments" should read -- segment --; line 37, "16" should read -- 13 --; same line 37, "approximately" should read -- appropriately --; line 38, "45" should read -- 145 --. Column 12, line 23, after "fluid" insert a comma. Column 13, line 68, "192" should read -- 191 --. Colum 14, line 5, "speel" should read -- speed --; line 43, between "and" and "plain" insert -- a --; line 47, "bearings" should read -- bearing --; line 52, "exacting" should read -- exactly line 61, "pool" should read -- spool --. Column 16, line 25, "first" should read -- third --. Column 17, line 29, "value" should read -- valve --. Column 18, line 4, "to generate a flui signal re-" should read -- actuated by movement of said --; lin 7, "fixed" should read -- fixedly --.

Signed and sealed this 12th day of May 1970.

(SEAL)
Attest:

EDWARD M. FLETCHER, JR.                      WILLIAM E. SCHUYLER,
Attesting Officer                              Commissioner of Pater

UNITED STATES PATENT OFFICE
CERTIFICATE OF CORRECTION

Patent No. 3,474,945            October 28, 1969

Victor Takata

It is certified that error appears in the above identified patent and that said Letters Patent are hereby corrected as shown below:

Column 8, line 29, between the second comma and "76" insert -- or --. Column 12, line 70, cancel the comma between "shaft" and "is". Column 15, line 68, "26, 27 and 28" should read -- 23, 24, and 25 --.

Signed and sealed this 29th day of September 1970.

(SEAL)
Attest:

Edward M. Fletcher, Jr.         WILLIAM E. SCHUYLER, JR.
Attesting Officer               Commissioner of Patents